United States Patent [19]
Hanson et al.

[11] 3,751,124
[45] Aug. 7, 1973

[54] STERN TUBE BEARING ARRANGEMENT FOR A PROPELLER SHAFT SUPPORTED BY A SPHERICAL ROLLER BEARING

[75] Inventors: Carl George Hanson; Folke Gunnar Bergling, both of Savedalen, Sweden

[73] Assignee: SKF Industrial Trading and Development Company N.V., Amsterdam, Netherlands

[22] Filed: Sept. 29, 1971

[21] Appl. No.: 184,715

[52] U.S. Cl. .................................................. 308/194
[51] Int. Cl. ............................................ F16c 23/08
[58] Field of Search ................... 308/194, 236, 36.1

[56] References Cited
UNITED STATES PATENTS

| | | | |
|---|---|---|---|
| 929,762 | 8/1909 | Hess | 308/236 |
| 3,304,139 | 2/1967 | Toth et al. | 308/236 |
| 3,433,540 | 3/1969 | Schneider | 308/36.1 |
| 3,187,591 | 6/1965 | Johnson | 308/194 |

FOREIGN PATENTS OR APPLICATIONS

| 606,336 | 7/1960 | Italy | 308/194 |
|---|---|---|---|

Primary Examiner—Charles J. Myhre
Assistant Examiner—Frank Susko
Attorney—Howson and Howson

[57] ABSTRACT

A stern tube bearing arrangement for a propeller shaft having a hub supported by a bearing assembly comprising an expansion sleeve assembly disposed between the bearing assembly and a cylindrical seat formed in a boss, said expansion sleeve assembly consisting of two interacting clamping sleeves which have tapered mating surfaces and which are movable axially relative to one another so that they are elastically deformed thereby expanding its outside diameter and decreasing its bore diameter to adjust the play between the bearing assembly and the seat, an annular member adjacent one axial end of one of said sleeves forming a circumferentially extending chamber, means for pressurizing said annular chamber thereby to effect axial movement of said clamping sleeves relative to one another.

10 Claims, 2 Drawing Figures

PATENTED AUG 7 1973 3,751,124

STERN TUBE BEARING ARRANGEMENT FOR A PROPELLER SHAFT SUPPORTED BY A SPHERICAL ROLLER BEARING

The invention concerns a stern tube bearing arrangement for a propeller shaft supported by a spherical roller bearing.

Normally a stern tube bearing arrangement incorporates a plain bearing which supports the propeller shaft. It is true that a number of attempts have been made to equip the shaft with a rolling bearing — usually a spherical roller bearing — but for the several reasons set forth below, the desired results have not been achieved.

One drawback has been the manufacture of the bearing seating in the stern tube opening, in the so-called boss. This applies in particular to large vessels where the diameter of the stern tube opening is in the region of 1.5 metres. It is very costly and difficult to machine such a large bore to the stringent tolerances which are required in order to enable a precision-made machine component like a rolling bearing to operate satisfactorily. There is also the risk that with excessive play the bore becomes worn, thereby increasing the clearance which can jeopardize the entire bearing arrangement by, for instance, preventing axial freedom of movement and having an unfavorable effect on the seals.

It must be possible to inspect the seals and even the actual bearing from time to time. With the conventional arrangement, i.e., with the bearing outer ring in direct contact with the boss, the space between the shaft and the boss is too small to permit inspection.

The direct contact also entails considerable risk of the components becoming jammed as the result of corrosion, thereby limiting the chances of dismounting the bearing without complications. With the bearing arrangement according to the invention, the aforementioned drawbacks are eliminated at the same time as important advantages are gained thereby.

The principal difference between a stern tube bearing arrangement according to the invention and conventional bearing arrangements of the kind in question is the expanding sleeve between the outer ring of the bearing and a cylindrical seating in the boss. This expanding sleeve embodies two interacting clamping sleeves with tapered mating surfaces. Under relative axial movement in one direction, these sleeves become elastically deformed so that the outside diameter of the expanding sleeve increases while its bore decreases.

By combining a stern tube bearing arrangement according to the invention with a static seal (which can be connected when the bearing is being mounted or dismounted) situated between the propeller and the bearing, and with support facilities for the propeller shaft, preferably arranged in conjunction with the seal, the combination provides the opportunity of being able to mount and dismount the bearing arrangement simply, without having to dock the ship. A dismounting is carried out as follows: Connection of the static seal, disconnection of the propeller shaft which then turns round the centre-point of the spherical bearing under the influence of the propeller's weight. The support then comes into use and the free end of the propeller shaft is subsequently adjusted vertically so that the bearing is unloaded. With the shaft in a fixed position, the bearing can then be dismounted and subsequently remounted in the recognized way without appreciable difficulty.

In order to explain the invention in detail, a representative design is described below with reference to the enclosed drawings.

Figure 1:
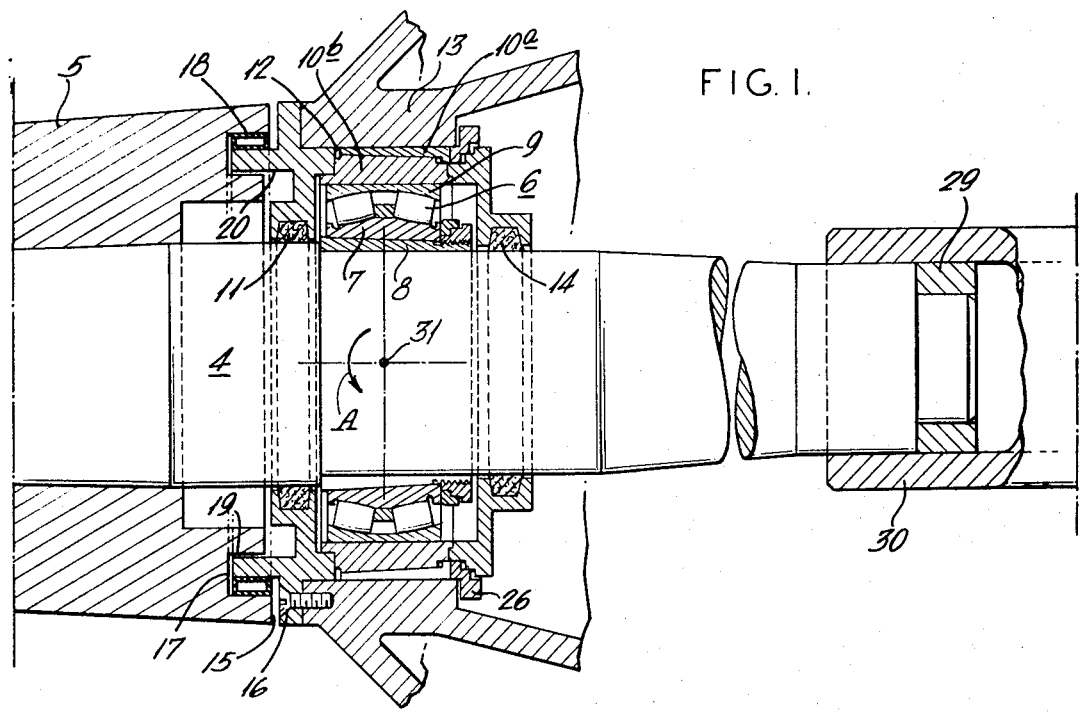
FIG. 1 shows a sectional view of a stern tube bearing arrangement.

In the FIGS., 4 denotes a shaft for a propeller, the hub of which is denoted 5. The shaft 4 is supported by a spherical roller bearing 6, the inner ring 7 of which is fixed on the shaft with the aid of an adapter sleeve 8. The bearing outer ring 9 rests in an inner clamping sleeve 10b which, together with an outer clamping sleeve 10a, forms an expanding sleeve located in a seating 12 in the boss 13. The clamping sleeves 10a and 10b have slightly tapered mating surfaces. With a relative axial movement in one direction, these sleeves will become elastically deformed and will cause the expanding sleeve to expand radially so that its outside diameter increases and its bore decreases. The radial thickness of the clamping sleeve 10a is appreciably less than that of the clamping sleeve 10b. The function of the expanding sleeve and the technical advantages it presents will be explained in greater detail below in conjunction with the description of how the stern tube bearing arrangement is mounted and dismounted.

Naturally, the bearing must be protected against water and foreign matter at the same time as the lubricant, in this case oil, must be retained in the bearing. For these reasons, the bearing has to be sealed by a seal 11 by the propeller and a seal 14 on the other side of the bearing. The seals 11 and 14 are sketched in on FIG. 1.

It is of great economic importance that a vessel need not be dry-docked when the seals and the bearing are to be inspected or replaced and that these operations can be carried out while the ship is afloat. For this purpose, the stern tube bearing arrangement is equipped with a static sealing device consisting of a labyrinth 15, the labyrinth-forming parts thereof 16 and 17 being designed in the propeller hub 5 and the boss 13 respectively, or a component connected thereto. A static seal 18 is arranged on the non-rotating part of the labyrinth, the boss part. In principle, the seal consists of one or several tubes which can be inflated, thereby filling one gap of the labyrinth so that it is sealed off statically. In addition, the labyrinth components 16 and 17 are provided with annular, adjacent supporting surfaces 19 and 20 which are not in contact with each other under operating conditions. The function of these supporting surfaces will be explained in conjunction with the description of the way in which the stern tube bearing arrangement is dismounted.

Figure 2:
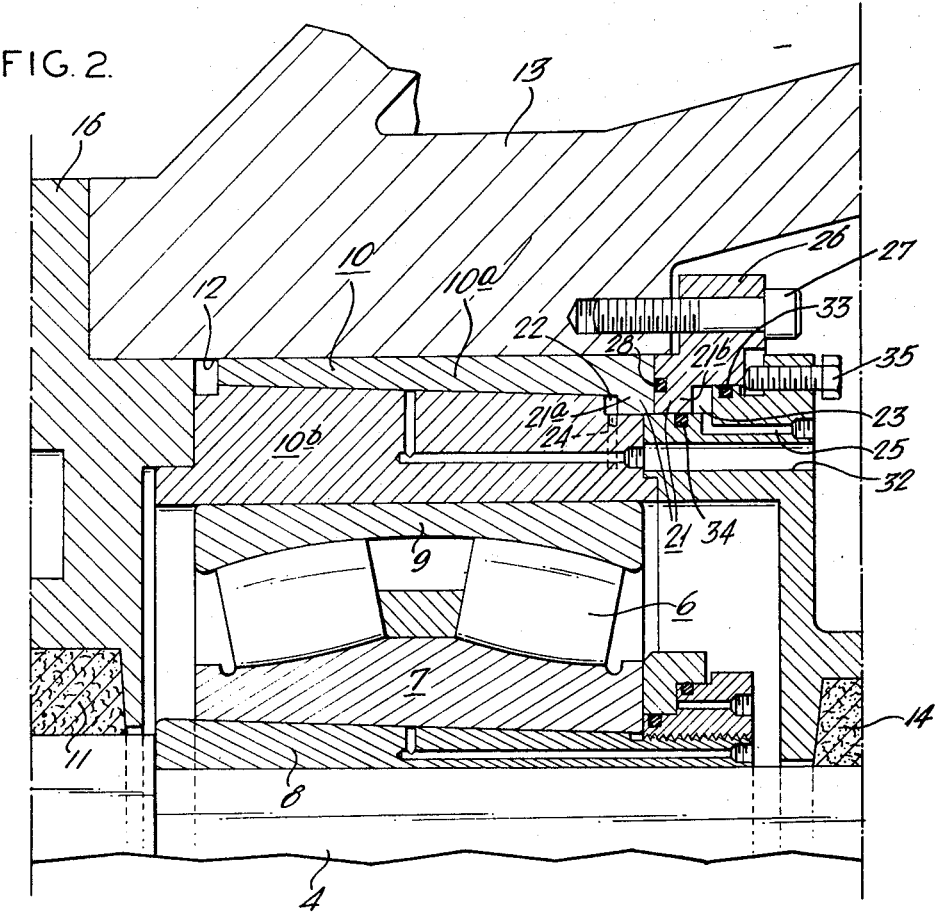
FIG. 2 illustrates the expanding sleeve and its adjacent components in the bearing arrangement on a somewhat larger scale than in FIG. 1.

FIG. 2 best illustrates the design and function of the expanding sleeve 10. Referring to this FIG., 21 denotes a ring flange which is made up of two parts 21a and 21b and in connected to the outer clamping sleeve 10a. The ring flange 21 separates two sealed annular pressure chambers, an inner one 22 and an outer one 23 to which ducts 24 and 25 respectively lead. Via these ducts, one of which is positioned in and the other adjacent to the inner clamping sleeve 10b, the pressure chambers are connected to a source of pressurized oil. The outer clamping sleeve 10a is connected to a flange 26 which can be secured to the boss 13 by means of bolts 27. A duct conveys the pressurized oil to the tapered surfaces of the clamping sleeves. If hydraulic pressure is now applied to duct 32 and simultaneously to pressure chamber 23 as well, while any pressure there might be in pressure chamber 22 is allowed to drop and the hydraulic medium it contains is evacuated, the clamping sleeves 10a and 10b will be displaced relative to each other under expansion, i.e., the outer clamping sleeve will be driven further up on the inner one. The opposite will occur, i.e., the outer clamping sleeve will slide off the inner one, if the pressure is applied to duct 32, and possibly simultaneously to pressure chamber 22 as well, while the pressure in pressure chamber 23 is reduced. The ring flange 21 embodies two annular parts 21a and 21b, 21a being connected direct to the outer clamping sleeve and 21b to the flange 26. An O-ring acts as a seal between the ring flange parts 21a and 21b. The advantage gained by not firmly securing the outer clamping sleeve to the flange 26 is that the flange does not move with the expansion of the clamping sleeve and in this way leakage through the O-ring seals 33 and 34 is eliminated. After the outer clamping sleeve has been driven up to the desired position, it is locked in place by locking screws 35.

The sequence of operations when dismounting a stern tube bearing arrangement according to the invention is as follows. The static seal 18 is brought into use by inflating it with air, whereupon the space behind the seal is drained. The propeller shaft is disconnected forward of the bearing by dismounting a coupling sleeve 30 (see FIG. 1) and removing an intermediate sleeve 29. The propeller, which is of considerable weight, will then sink, i.e., the shaft will turn in the direction of the arrow A round the bearing center 31, sufficiently to allow the labyrinth's 15 supporting surfaces 19 and 20 to make contact with each other. By sinking or possibly raising the shaft end a little, depending upon the balance position, the bearing can be entirely unloaded and feeler gauges can be inserted between the rollers and the outer ring to check that the bearing is completely unloaded. Now the bolts 27 and the locking screws 35 are undone and a small amount of hydraulic pressure is applied to pressure chamber 23 at the same time as a somewhat higher pressure is applied between the tapered mating surfaces of the clamping sleeves via the duct 32. The pressure on the tapered surfaces now endeavours to push the outer clamping sleeve off the inner one. Should the pressure on the tapered surfaces prove to be insufficient, the pressure can also be applied to pressure chamber 22. The counter-pressure in pressure chamber 23 acts as a brake. By reducing the counter-pressure in a suitable manner the slide-off speed can be regulated.

When mounting the bearing arrangement, the procedure is in the main reversed. All the ring-shaped bearing arrangement components, such as seals, the bearing with its adapter sleeve and the expanding sleeve, are placed on the free end of the shaft whereupon the shaft is located in the center of the stern tube opening, supported by the labyrinth's supporting surfaces and with the free shaft end fixed in a suitable way. The bearing is secured on the shaft and is drawn upon its adapter sleeve 8 to a position where the stipulated bearing internal clearance is attained. The expanding sleeve 10, which externally has a clearance of 0.7 - 1 mm to the seating in the boss and 0.5 mm to the bearing outer ring, is placed in position and the flange 26 is securely bolted to the boss 13. Via the duct 32 the oil is led to the tapered surfaces of the expanding sleeve at the same time as pressure is applied to pressure chamber 23 and the pressure chamber 22 is open. As the outer clamping sleeve 10a is thinner than the inner one 10b, on being driven up it expands more than the inner one compresses. Then the clearance to the boss will be eliminated first and the expanding sleeve will be fixed in the stern tube opening. The drive-up is then continued until a clearance of circa 0.15 mm is obtained between the bearing outer ring and the expanding sleeve. The invention accordingly enables the play between the bearing outer ring and the expanding sleeve, which is necessary for the bearing's freedom of movement, to be accurately adjusted.

The stern tube bearing arrangement which has been described can, of course, be modified in several respects while remaining within the compass of the idea of the invention. The ring-shaped flange 21 can, by way of example, be arranged on the inner clamping sleeve or connected to the same instead of on the outer clamping sleeve. It is obvious that the expanding sleeve could also consist of three or more sleeves with separate adjustment facilities. With such an arrangement, very wide tolerances can be accepted but, on the other hand, the design will be more complicated.

We claim:

1. A stern tube bearing arrangement for a propeller shaft having a hub supported by a rolling bearing assembly comprising inner and outer rings and a plurality of rolling elements in the annular space between the inner and outer rings comprising an expansion sleeve assembly disposed between the outer ring of the bearing assembly and a cylindrical seat formed in a boss aligned with said hub, said expansion sleeve assembly consisting of two interacting clamping sleeves which have tapered mating surfaces and which are movable axially relative to one another so that they are elastically deformed thereby expanding its outside diameter and decreasing its bore diameter to adjust the play between the outer ring and the seat, one of said sleeves in direct contact with the surface forming the seat in the boss.

2. A stern tube bearing arrangement as claimed in claim 1 including at least one annular member abutting at least one of said sleeves and including means for securing said annular member to the boss when the sleeves are set in a predetermined position relative to one another.

3. A stern tube bearing arrangement as claimed in claim 1 wherein the outer expansion sleeve is of smaller cross section than the inner expansion sleeve.

4. A stern tube bearing arrangement as claimed in claim 1 including a pair of seal members engaging the shaft on opposite sides of the bearing assembly.

5. A stern tube bearing arrangement for a propeller shaft having a hub supported by a bearing assembly comprising an expansion sleeve assembly disposed between the bearing assembly and a cylindrical seat formed in a boss aligned with said hub, said expansion sleeve assembly consisting of two interacting clamping sleeves which have tapered mating surfaces and which are movable axially relative to one another so that they are elastically deformed thereby expanding its outside diameter and decreasing its bore diameter to adjust the play between the bearing assembly and the seat, an annular member adjacent one axial end of one of said sleeves forming a circumferentially extending chamber, means for pressurizing said annular chamber thereby to effect axial movement of said clamping sleeves relative to one another.

6. A stern tube bearing arrangement as claimed in claim 5 wherein the bearing assembly comprises inner and outer rings and a plurality of rolling elements in the annular space between the rings and wherein the inner clamping sleeve engages the outer ring of the bearing assembly.

7. A stern tube bearing arrangement for a propeller shaft having a hub supported by a rolling bearing assembly comprising inner and outer rings and a plurality of rolling elements in the annular space between the inner and outer rings comprising an expansion sleeve member disposed between the outer ring of the bearing assembly and a cylindrical seat formed in a boss aligned with said hub, said expansion sleeve member consisting of two interacting clamping sleeves which have tapered mating surfaces and which are movable axially relative to one another so that they are elastically deformed thereby expanding its outside diameter and decreasing its bore diameter to adjust the play between the outer ring and the seat, and a static seal assembly disposed between the hub and bearing operative during mounting and dismounting of the bearing assembly.

8. A stern tube bearing arrangement as claimed in claim 7 wherein the hub is formed with a circumferentially extending groove and including an annular member having a circumferential projecting engaging in the groove, the projection and groove having adjacent supporting surfaces which are normally slightly spaced apart.

9. A stern tube bearing arrangement as claimed in claim 8 wherein said static seal is disposed between said projection and groove.

10. A method of dismounting a stern tube bearing assembly for a propeller shaft having a hub supported by the rolling bearing assembly consisting of the steps of connecting a static seal assembly between the hub and a labyrinth cooperating with the hub, disconnecting the propeller shaft from its drive connection whereby the center point of the spherical bearing rotating slightly due to the weight of the propeller whereby in turn the cooperating surfaces of the labyrinth and hub contact each other, adjusting the free end of the propeller shaft vertically and laterally to unload the bearing and thereafter dismounting the bearing.

* * * * *

UNITED STATES PATENT OFFICE
CERTIFICATE OF CORRECTION

Patent No. 3,751,124  Dated August 7, 1973

Inventor(s) Carl George Hanson et al.

It is certified that error appears in the above-identified patent and that said Letters Patent are hereby corrected as shown below:

In the heading insert -- [30] Foreign Application Priority Data    September 29, 1970    Sweden    13 169/70   --.

Signed and sealed this 26th day of February 1974.

(SEAL)
Attest:

EDWARD M. FLETCHER, JR.  C. MARSHALL DANN
Attesting Officer  Commissioner of Patents